US010805135B2

(12) United States Patent
Lang et al.

(10) Patent No.: US 10,805,135 B2
(45) Date of Patent: Oct. 13, 2020

(54) METHODS AND APPARATUSES FOR PROCESSING AN OFDM RADAR SIGNAL

(71) Applicant: Infineon Technologies AG, Neubiberg (DE)

(72) Inventors: Oliver Lang, Linz (AT); Alexander Onic, Linz (AT); Christian Schmid, Linz (AT)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 16/529,008

(22) Filed: Aug. 1, 2019

(65) Prior Publication Data

US 2020/0052941 A1 Feb. 13, 2020

(30) Foreign Application Priority Data

Aug. 8, 2018 (DE) .................. 10 2018 119 278

(51) Int. Cl.
*H04L 27/28* (2006.01)
*H04L 27/26* (2006.01)
*H04L 5/00* (2006.01)
*G01S 13/00* (2006.01)
*G01S 13/02* (2006.01)

(52) U.S. Cl.
CPC .......... *H04L 27/265* (2013.01); *G01S 13/003* (2013.01); *H04L 5/0007* (2013.01); *G01S 2013/0245* (2013.01)

(58) Field of Classification Search
CPC ... H04L 27/265; H04L 5/0007; G01S 13/003; G01S 2013/0245

USPC ......................................................... 375/260
See application file for complete search history.

(56) References Cited

U.S. PATENT DOCUMENTS

| 8,340,221 | B1 * | 12/2012 | Cheng ................. H04L 27/2659 375/316 |
| 2004/0082356 | A1 * | 4/2004 | Walton ................. H04B 7/0697 455/522 |
| 2010/0246726 | A1 * | 9/2010 | Asjadi ................... H04L 27/265 375/340 |
| 2019/0052486 | A1 * | 2/2019 | Kuchi ............... H04L 25/03834 |

FOREIGN PATENT DOCUMENTS

DE 102009019905 A1 11/2010

* cited by examiner

*Primary Examiner* — Don N Vo
(74) *Attorney, Agent, or Firm* — Design IP

(57) ABSTRACT

Methods for processing an OFDM radar signal are provided. A plurality of $N_c \times N_{DS}$ receive samples corresponding to a number of $N_{DS}$ consecutive OFDM symbols is received, each OFDM symbol comprising a plurality of $N_c$ subcarriers modulated with a respective modulation symbol. Each of the plurality of $N_c \times N_{DS}$ receive samples is divided by its respective modulation symbol to generate a number of $N_{DS}$ processed OFDM symbols. The number of $N_{DS}$ processed OFDM symbols is decimated to generate at least one decimated OFDM symbol. A first type discrete Fourier transform (e.g. IFFT) of the at least one decimated OFDM symbol is performed to generate at least one first transformed vector.

21 Claims, 10 Drawing Sheets

METHODS AND APPARATUSES FOR PROCESSING AN OFDM RADAR SIGNAL

FIELD

Embodiments of the present disclosure generally relate to radar systems and, more particularly, to orthogonal frequency-division multiplexing (OFDM) radar systems.

BACKGROUND

Nowadays, the importance of radar sensors for automotive applications is increasing steeply. Besides of advanced driver assistant systems (ADAS) becoming more and more popular, autonomous driving (AD) has gained much attention from academia and industry. For ADAS and AD, radar sensors play a major role by scanning the surrounding of a car. Also, car-to-car communication has gained interest as a possible safety feature for AD cars. A radar waveform that allows simultaneous sensing and communication is the OFDM wave-form, which is therefore a promising candidate for future automotive radar systems. The basic principle of an OFDM signal and the inter-relationship between the frequency and time domains is well known and can be summarized as follows.

In the frequency domain, a plurality of Nc adjacent tones or subcarriers are each independently modulated with complex data, also referred to as modulation symbols. An Inverse Fast Fourier Transform (IFFT) transform is performed on the frequency-domain sub-carriers to produce an OFDM symbol in the time-domain. Then in the time domain, guard intervals are inserted between each of the OFDM symbols to prevent inter-symbol interference at a receiver caused by multi-path delay spread in the radio channel. Multiple OFDM symbols can be concatenated to create the final OFDM burst signal. At the receiver, a Fast Fourier Transform (FFT) is performed on the received OFDM symbols to recover the original modulation symbols.

However, in its standard implementation, the OFDM waveform comes with challenging hardware requirements especially in terms of the memory required for storing the received OFDM symbols. Moreover, for radar applications one does not have full control over the size of the range-velocity map (RVM).

Thus, there is a desire to reduce the required memory, the computational demands, and provide more control over the size of the RVM for OFDM radar systems.

SUMMARY

This desire is met by methods and apparatuses in accordance with the independent claims. Further potentially advantageous embodiments are subject of the dependent claims and/or the following description.

According to a first aspect of the present disclosure it is provided a method for processing an OFDM radar signal. The method includes receiving a plurality of $N_c \times N_{DS}$ receive samples corresponding to a number of $N_{DS}$ ($N_{DS} \geq 1$) consecutive OFDM symbols. Each OFDM symbol comprises a plurality of $N_c$ subcarriers modulated with a respective modulation symbol. Each of the plurality of $N_c \times N_{DS}$ receive samples is processed by division with its respective modulation symbol to generate a number of $N_{DS}$ processed OFDM symbols. The number of $N_{DS}$ processed OFDM symbols is decimated to generate at least one decimated OFDM symbol. A first type discrete Fourier transform of the at least one decimated OFDM symbol is performed to generate at least one first transformed vector.

Decimating the (processed) OFDM symbols before processing them further can reduce memory requirements. This is particularly interesting for automotive applications.

Unless specifically stated, the general expression "discrete Fourier transform" encompasses Fourier transforms in both directions, i.e., from time domain to frequency domain, also referred to as discrete Fourier transform (DFT), and, vice versa, from frequency domain to time domain, also referred to as inverse discrete Fourier transform (IDFT). Thus, a first type discrete Fourier transform can either relate to a DFT or to an IDFT, whereas a second type discrete Fourier transform then relates to the respective other direction.

In some embodiments, decimating the number of $N_{DS}$ processed OFDM symbols comprises reducing the number of $N_{DS}$ processed OFDM symbols to a number lower than $N_{DS}$. This reduction can be implemented in various ways. One possible implementation comprises averaging the $N_{DS}$ processed OFDM symbols. Compared to simply throwing one or more processed OFDM symbols away, which would also be a feasible option, averaging the $N_{DS}$ processed OFDM symbols can lead to an improved Signal-to-Noise Ratio (SNR).

In some embodiments, the method can further include extracting range or distance information from the at least one first transformed vector, the range information being indicative of a distance of objects from which the OFDM radar signal has been reflected. In case the first type discrete Fourier transform is an IDFT e.g. an Inverse Fast Fourier Transform (IFFT), the at least one first transformed vector comprises range or distance information which can be used as part of the RVM. The IDFT or IFFT can be regarded similar to mixing the received signal with a transmit signal, as it is typically done in Frequency Modulated Continuous Wave (FMCW) radar systems.

In some embodiments, the method can further include reducing a number of $N_c$ elements of the at least one first transformed vector to $N_R < N_c$ in order to generate at least one shortened transformed vector (i.e. a vector having a reduced size) comprising $N_R$ elements. In this way, range or distance information of no or less interest can be compressed or discarded, which in return can lead to further reduced memory requirements. Thus, in some embodiments, reducing the number of $N_c$ elements comprises discarding or combining predetermined elements of the at least one first transformed vector.

In some embodiments, the method further includes repeating the acts of the method of any one of the previous claims until a number of $N_{sym} = n \times N_{DS}$ consecutive OFDM symbols has been received. In other words, if a burst of OFDM symbols comprises $N_{sym}$ consecutive OFDM symbols, the method is performed iteratively until all $N_{sym}$ OFDM symbols have been processed. If each iteration processes $N_{DS}$ consecutive OFDM symbols, it takes n iterations to process the whole burst of $N_{sym}$ OFDM symbols.

In some embodiments, the method further includes performing a second type discrete Fourier transform over rows of a matrix, $D_{Div,Dec}$, to generate a plurality of second transformed vectors. The matrix $D_{Div,Dec}$ can contain n columns of n consecutive first transformed vectors. If the first type discrete Fourier transform refers to an IDFT or IFFT, the second type discrete Fourier transform refers to a DFT or FFT, for example. In some embodiments, the matrix $D_{Div,Dec}$ contains $N_R < N_c$ rows and $n = N_{sym}/N_{DS}$ columns, wherein $N_R$ corresponds to a reduced number of elements of each of the n consecutive first transformed vectors. With this operation, Doppler or velocity information of the RVM can be generated. Thus, in some embodiments, the method further includes extracting velocity information from the second transformed vectors, wherein the velocity information is indicative of a velocity of objects from which the OFDM radar signal has been reflected.

The skilled person having benefit from the present disclosure will appreciate that the principles of the proposed concept can be used for Singe-Input Single-Output (SISO) as well as for Multiple-Input Multiple-Output (MIMO) OFDM radar systems. In the latter case, a first subset of the $N_c$ subcarriers can be associated with a first transmit antenna and a second subset of the $N_c$ subcarriers can be associated with a second transmit antenna. The first and the second subsets can be disjoint subcarrier subsets. Receiving the plurality of $N_c \times N_{DS}$ receive samples can comprise receiving $N_c \times N_{DS}$ samples at each of a plurality of receive antennas. In the MIMO case, the method can further comprise generating at least one decimated OFDM symbol for each transmit-receive antenna pair, and performing, for each transmit-receive antenna pair, a first type discrete Fourier transform (e.g., an IDFT or IFFT) of the respective decimated OFDM symbol to generate a respective first transformed vector.

The skilled person having benefit from the present disclosure will appreciate that the order of decimation and the first type discrete Fourier transformation can be exchanged without departing from the principles of the present disclosure. Thus, according to a further aspect of the present disclosure it is provided a method for processing an OFDM radar signal. The method includes receiving a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol. The method further includes processing each of the plurality of $N_c \times N_{DS}$ receive samples by division with its respective modulation symbol to generate a number of $N_{DS}$ processed OFDM symbols, performing a first type discrete Fourier transform of the number of $N_{DS}$ processed OFDM symbols to generate a number of $N_{DS}$ respective transformed vectors, and decimating the number of $N_{DS}$ transformed vectors to generate at least one decimated transformed vector.

In some embodiments, decimating the number of $N_{DS}$ transformed vectors comprises averaging the $N_{DS}$ transformed vectors, which can lead to good SNR results.

In some embodiments, the method further includes reducing a number of $N_c$ elements of the at least one first transformed vector to $N_R < N_c$ in order to generate at least one shortened transformed vector comprising $N_R$ elements. This can further reduce memory requirements.

In some embodiments, the method further includes performing a second type discrete Fourier transform (e.g., a DFT or FFT) of the at least one shortened transformed vector. In this way, velocity information can be generated.

According to another aspect of the present disclosure it is provided a computer program having a program code for performing the method of any one of the previous claims, when the computer program is executed on a programmable hardware device.

According to yet another aspect of the present disclosure it is provided an apparatus for processing an OFDM radar signal. The apparatus comprises a receiver which is configured to receive a plurality of $N_c \times N_{DS}$ receive samples corresponding to number of $N_{DS}$ consecutive OFDM symbols, wherein each OFDM symbol comprises a plurality of $N_c$ subcarriers modulated with a respective modulation symbol. The apparatus also comprises a processor which is configured to process each of the plurality of $N_c \times N_{DS}$ receive samples by division with its respective modulation symbol to generate a number of $N_{DS}$ processed OFDM symbols, to decimate the number of $N_{DS}$ processed OFDM symbols to generate at least one decimated OFDM symbol, and to perform a first type discrete Fourier transform of the at least one decimated OFDM symbol to generate at least one first transformed vector.

In some embodiments, the processor is further configured to reduce a number of $N_c$ elements of the at least one first transformed vector to $N_R < N_c$ in order to generate at least one shortened transformed vector comprising $N_R$ elements, and to perform a second type discrete Fourier transform of the at least one shortened transformed vector to generate at least one second transformed vector.

According to yet another aspect of the present disclosure it is provided an apparatus for processing an OFDM radar signal. The apparatus comprises a receiver which is configured to receive a plurality of $N_c \times N_{DS}$ receive samples corresponding to a number of $N_{DS}$ consecutive OFDM symbols, wherein each OFDM symbol comprises a plurality of $N_c$ subcarriers modulated with a respective modulation symbol. The apparatus comprise a processor which is configured to process each of the plurality of $N_c \times N_{DS}$ receive samples by division with its respective modulation symbol to generate a number of $N_{DS}$ processed OFDM symbols, to perform a first type discrete Fourier transform of the number of $N_{DS}$ processed OFDM symbols to generate a number of $N_{DS}$ respective transformed vectors, and to decimate the number of $N_{DS}$ transformed vectors to generate at least one decimated transformed vector. Here, the order of decimation and the first type discrete Fourier transformation is exchanged with regard to the previous example without departing from the principles of the present disclosure.

According to yet another aspect of the present disclosure it is provided an OFDM radar transceiver comprising the apparatus of any one of the aforementioned embodiments.

In some embodiments, the order of the acts of decimation and element-wise division may be reversed. In this case the number of $N_{DS}$ received OFDM symbols may first be decimated to generate at least one decimated OFDM symbol. Each sample of the at least one decimated OFDM symbol may then be processed by division with a respective decimated modulation symbol to generate at least one processed OFDM symbol. For example, a first type discrete Fourier transform of the at least one processed OFDM symbol may then be performed to generate at least one first transformed vector.

In this disclosure, an OFDM receiver signal processing scheme is proposed that can reduce the required memory, reduces computational demands, and can give full control over the size of the RVM.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

The terminology used herein for the purpose of describing the minimum length of a DFT and/or FFT is "FFT operation of length N". Increasing the length N by means of zero-padding, i.e. appending the input vector with zeros, shall be included.

Unless otherwise defined, all terms (including technical and scientific terms) are used herein in their ordinary meaning of the art to which the examples belong.

Figure 1A:
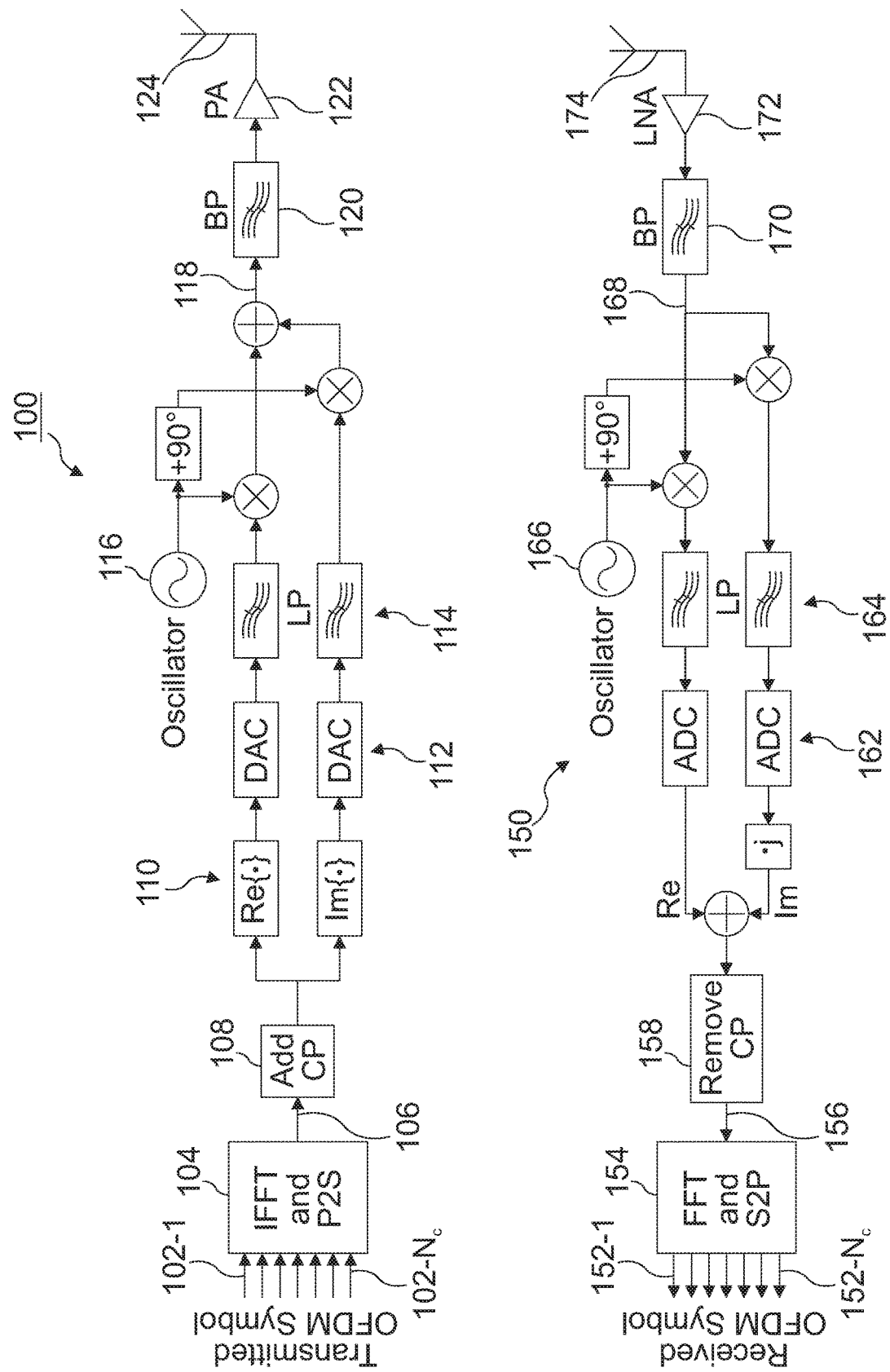
FIG. 1A shows a block diagram of an OFDM radar transceiver.

FIG. 1A shows a block diagram of an example OFDM radar transceiver including an OFDM transmitter 100 and an OFDM receiver 150, the working principle of which is described in the following.

In the frequency domain, a number of $N_c$ adjacent subcarriers 102-1 to 102-$N_c$ are each independently modulated with complex data or modulation symbols, such as binary phase shift keying (BPSK) or quadrature phase shift keying (QPSK) symbols, for example. At 104, an IFFT is performed on the frequency-domain subcarriers to produce a complex-valued OFDM symbol 106 in the time-domain. Then, in the time domain, guard intervals, also called cyclic prefix (CP), are inserted between each of the OFDM symbols at 108 to prevent inter-symbol interference at the receiver 150 caused by multi-path delay spread in the radio channel. The OFDM symbols with CP are then converted to radio frequency (RF) domain via quadrature mixing. For that purpose, real (in-phase, I) and quadrature (Q) components of the digital complex-valued OFDM symbols are digital-to-analog converted via respective digital-to-analog converters (DACs) 112. The digital-to-analog converted quadrature components are then filtered with respective low pass filters 114 before they are up-converted to radio-frequency (RF) domain via 90°-phase-shifted oscillator signals coming from local oscillator 116 running at carrier frequency $f_c$. The resulting RF signal 118 is bandpass (BP) filtered using band pass filter 120, amplified via power amplifier (PA) 122, and radiated over one or more antennas 124. Multiple subsequent OFDM symbols can be concatenated to create the final OFDM burst signal.

At the OFDM receiver 150, one or more receive antennas 174 receive the OFDM burst signal which is then amplified by a low noise amplifier (LNA) 172 and bandpass filtered at 170. The resulting receive signal is down-converted to baseband via a quadrature mixer comprising an oscillator 166 running at carrier frequency $f_c$. After mixing, the respective quadrature components are low pass filtered with respective low pass filters at 164. The resulting signals are analog-to-digital converted via respective analog-to-digital converters (ADCs) 162 to obtain a complex valued digital baseband signal, the CP of which is removed at 158. The resulting frame of $N_c$ complex valued samples is then converted to frequency domain via a FFT to recover the OFDM symbol comprising a number of $N_c$ modulated subcarrier samples 152-1 to 152-$N_c$.

Figure 1B:
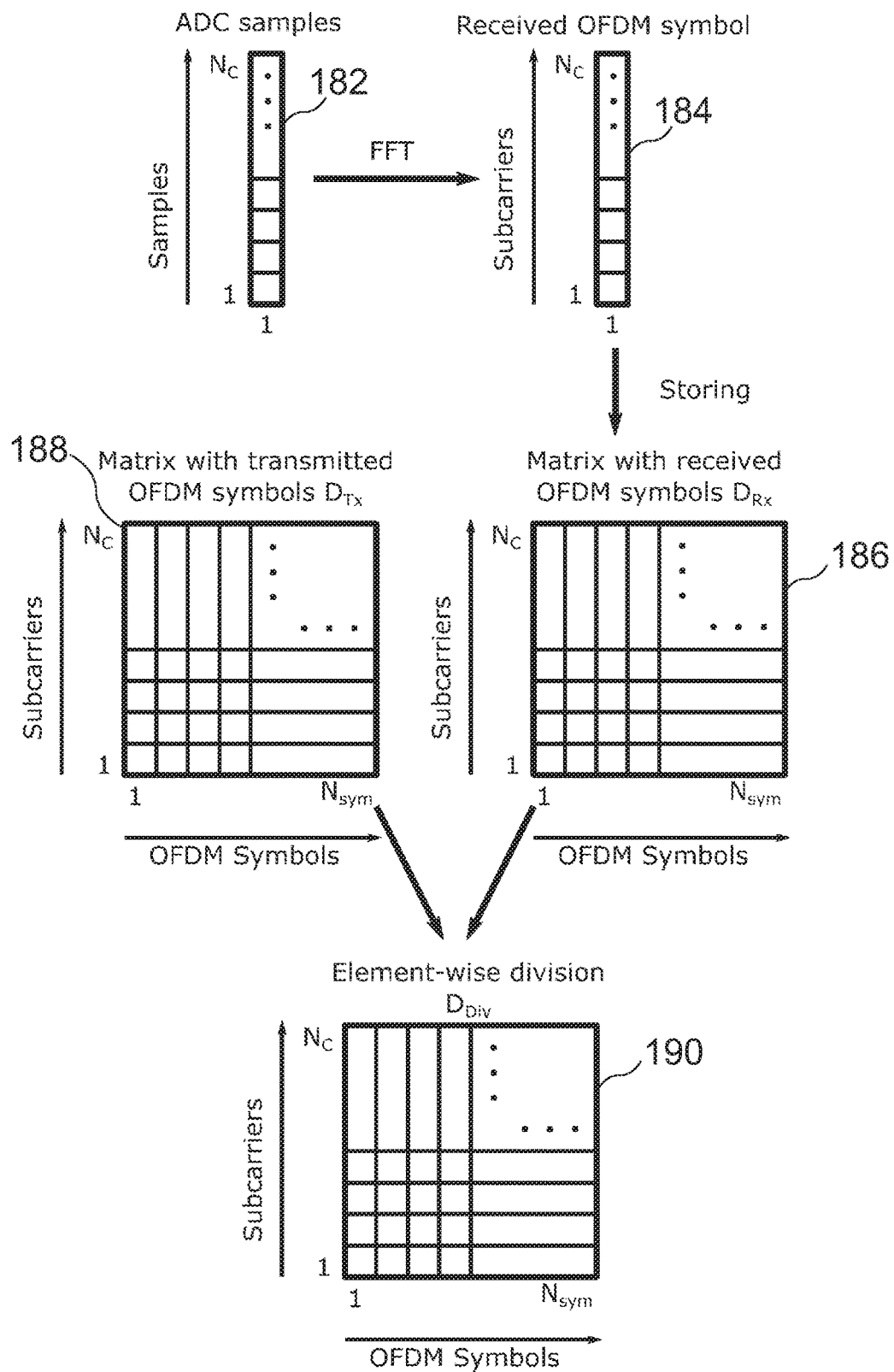
FIG. 1B illustrates a conventional receiver signal processing scheme in a conventional OFDM receiver.

A basic OFDM radar receiver signal processing scheme considered in this disclosure for obtaining the RVM is visualized in FIG. 1B.

A frame 182 of $N_c$ analog-to-digital converted receive samples 156 is transformed via a discrete Fourier transform, e.g. a fast Fourier transform (FFT), to recover an OFDM symbol 184 comprising a number of $N_c$ received data symbols 152-1 to 152-$N_c$. $N_c$ denotes the number of OFDM subcarriers. Conventionally, $N_{sym}$ consecutively received OFDM symbols are stored in a matrix $D_{Rx}$ 186 of size $N_c \times N_{sym}$. Matrix $D_{Rx}$ 186 thus represents a burst of $N_{sym}$ consecutive OFDM symbols, each OFDM symbol comprising $N_c$ received data symbols 152-1 to 152-$N_c$. An element-wise division of this matrix $D_{Rx}$ 186 with a $N_c \times N_{sym}$ matrix $D_{Tx}$ 188 containing the transmitted OFDM symbols, each transmitted OFDM symbol comprising $N_c$ transmitted data symbols, leads to a $N_c \times N_{sym}$ matrix $D_{Div}$ 190 corresponding to $N_{sym}$ normalized or processed OFDM symbols. The $N_c \times N_{sym}$ entries of $D_{Div}$ can be regarded as complex-valued channel coefficients of the $N_c \times N_{sym}$ respective radio channels. Inverse FFT (IFFT) and FFT operations applied on the columns and rows of $D_{Div}$ yield a range-velocity map (RVM) of size $N_c \times N_{sym}$.

The OFDM radar receiver signal processing scheme of FIG. 1B can be summarized as follows: a plurality of $N_c \times N_{sym}$ receive samples corresponding to a plurality of $N_{sym}$ consecutive OFDM symbols is received. Each received OFDM symbol comprises a plurality of $N_c$ subcarriers modulated with a respective modulation symbol. The $N_{sym}$ consecutively received OFDM symbols can be stored in a matrix $D_{Rx}$ of size $N_c \times N_{sym}$. Each of the plurality of $N_c \times N_{sym}$ receive samples is divided by its respective modulation symbol contained in $N_c \times N_{sym}$ matrix $D_{Tx}$ to generate a plurality of $N_{sym}$ processed or normalized OFDM symbols stored in $N_c \times N_{sym}$ matrix $D_{Div}$. Then, IFFT and/or FFT operations can be applied on the columns and rows of $D_{Div}$ to yield a range-velocity map (RVM) of size $N_c \times N_{sym}$. Range-velocity maps are sometimes referred in the literature as range-doppler maps.

The OFDM waveform features four main system parameters: the carrier frequency $f_c$, the signal bandwidth B, the number of subcarriers $N_c$, the number of consecutively transmitted OFDM symbols $N_{sym}$ within one burst. These parameters determine four key performance measures of the radar system, which are: the maximum unambiguous range $R_{max}$, the range resolution $\Delta R$, the maximum unambiguous relative velocity $v_{max}$, the velocity resolution $\Delta v$. The connection between those key performance measures and the four main system parameters is given by $$R_{max} = \frac{c_0 N_c}{2B} \quad v_{max} = \pm \frac{c_0}{4 f_c (T_{cp} + T_0)} \quad (1)$$

$$\Delta R = \frac{c_0}{2B} \quad \Delta v = \frac{c_0}{2 f_c N_{sym}(T_{cp} + T_0)}, \quad (2)$$

where $T_0 = N_c/B$ is the duration of one OFDM symbol and where $T_{cp}$ is the length of the cyclic prefix. In addition, there may exist other limiting factors. For example, the length of the cyclic prefix also influences the maximum sensing distance, or the subcarrier spacing of $\Delta f = B/N_c$ limits the maximum allowed relative velocity of an object in order to have approximately inter-carrier interference (ICI) free operation. $N_c$ and $N_{sym}$ determine the required memory for storing the received data as well as the computational burden for range and Doppler processing. For example, in a conventional single-input single-output (SISO) OFDM system, range processing requires $N_{sym}$ IFFT operations of length $N_c$, while Doppler processing requires $N_c$ FFT operations of length $N_{sym}$. The memory for storing all received OFDM symbols with an example word-length of 16 bit sums up to $2 N_c N_{sym} 16/(8 \ast 10^6)$ Mbyte. In the remainder of this disclosure, it is assumed that the memory for storing the received OFDM symbols is reused for storing the RVM. However, the disclosure is not limited thereto.

Reconsider the aforementioned main system parameters. The carrier frequency $f_c$ is usually fixed or limited to be within a certain frequency band. The remaining three system parameters can be adjusted to obtain adequate values for the four performance measures. However, since there are more performance measures than adjustable system parameters, not every performance measure can be chosen independently. In the 77 GHz band, for example, adequate values for the system parameters lead to unnecessary large values of $R_{max}$ and/or $v_{max}$. For example, for $f_c = 77$ GHz, $T_{cp} = 0.51$ μs, B=1 GHz, $N_c = 2048$, and $N_{sym} = 4096$, the achieved performance measures according to Eq. (1)-(2) are: $R_{max} = 307$ m; $\Delta R = 0.15$ m; $v_{max} = \pm 380$ m/s; $\Delta v = 0.19$ m/s. Moreover, the total time for transmitting the complete OFDM burst in this example is $T_d = N_{sym}(T_{cp} + T_0) = 10.5$ ms and the processing gain is $G_p = 10 \log 10(N_{sym} N_c) = 69$ dB. First of all, note the large value of $R_{max}$, which is even larger than required for a typical automotive long range radar (LRR). Also note that in this example, the maximum range according to the limitations of the cyclic prefix is only 76.5 m. Moreover, also $v_{max}$ can be considered to be way too large for automotive applications. The large numbers of $N_c$ and $N_{sym}$, although required to attain a certain range and velocity resolution, come with a large computational burden in terms of the required IFFT/FFT operations for range and Doppler processing. Finally, the memory for storing the received OFDM symbols must have a size of 33.5 Mbyte for the above described example. Such a large memory is hardly feasible in an automotive radar chip having size and cost constraints.

Several possible methods exist to overcome some of the mentioned drawbacks. For example, a way to decrease $v_{max}$ would be to increase $T_{cp}$. However, the computational burden and the memory requirements would remain unaffected. Another way to decrease $v_{max}$ would be to transmit not every single OFDM symbol but only every second or third, which would decrease the processing gain as well as the SNR. Both, $R_{max}$ and $v_{max}$ may be reduced by dismissing the corresponding rows and columns in the range-velocity map (RVM). The major drawback of doing so is that the memory required for storing the received OFDM symbols remains unaltered.

In this disclosure, an OFDM radar receiver signal processing concept is proposed that can avoid unnecessary large values of $R_{max}$ and/or $v_{max}$. Such an OFDM radar receiver can have one or more of the following beneficial properties:
it can reduce the memory required for storing the received OFDM symbols (i.e. the memory for storing the RVM),
it can dismiss cells in the RVM that are unnecessary for automotive applications,
it can reduce the computational overhead for deriving the RVM,
the velocity resolution $\Delta v$ and/or the range resolution $\Delta R$ are not affected in a negative way.

The proposed concept will be primarily described for a SISO OFDM radar system. The concept can be extended to MIMO systems as will be described with respect to FIG. 6.

The reason for the unnecessary large values of $v_{max}$ lies in the short time $T_{cp} + T_0$ needed for transmitting and receiving one OFDM symbol. In the example mentioned above, this time is only 2.56 μs. Hence, a new measurement is performed every 2.56 μs. Comparing this value with a typical chirp repetition time in a frequency-modulated continuous wave (FMCW) radar of 30 to 60 μs explains the large differences in $v_{max}$ between these radar systems. However, in the considered example OFDM radar system, $T_{cp} + T_0$ is too short. This problem can be overcome by an additional decimation.

Figure 2:
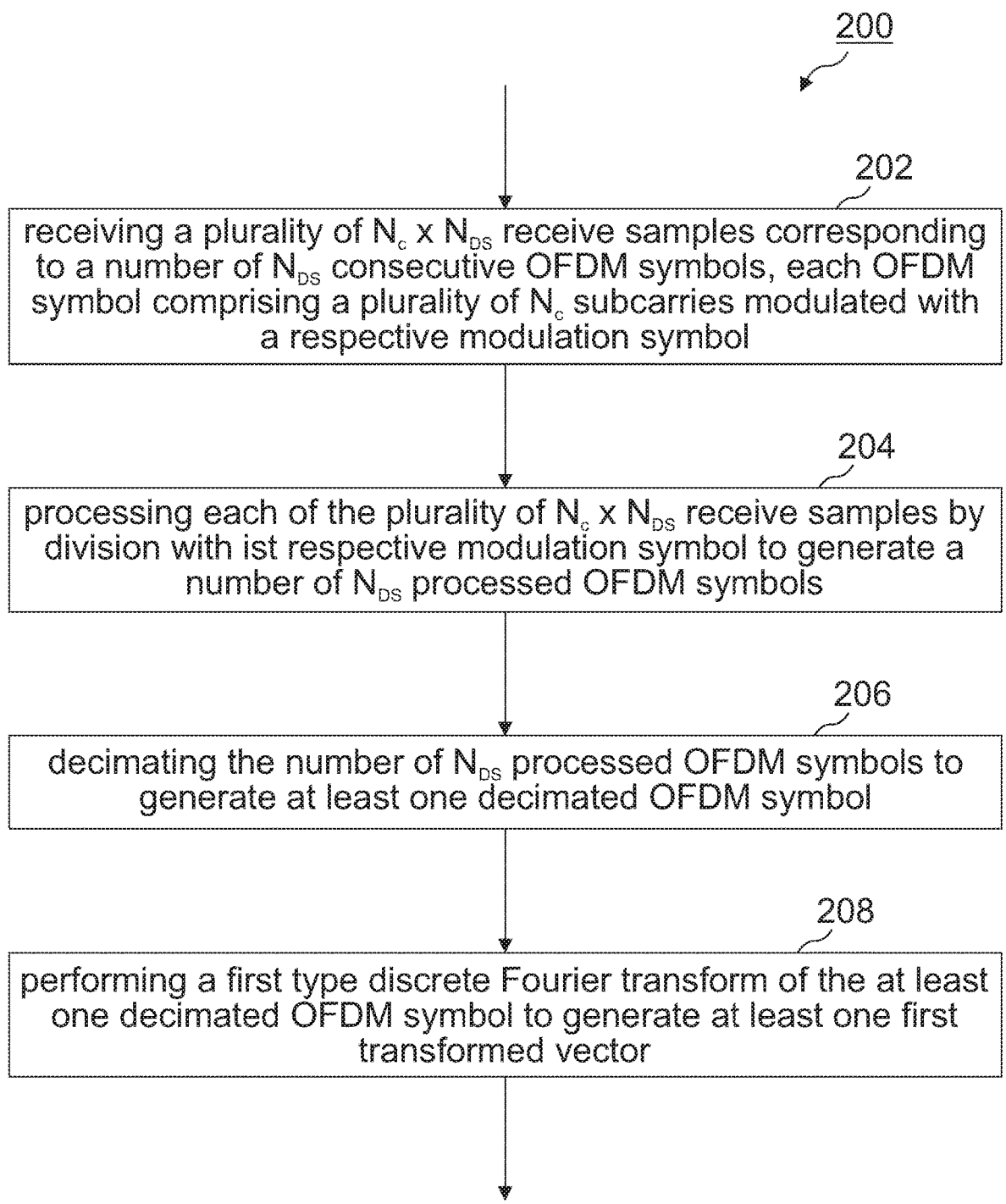
FIG. 2 shows a flowchart of a method for processing an OFDM radar signal according to a basic embodiment.

FIG. 2 shows a flowchart of a basic embodiment of a method 200 for processing an OFDM radar signal in accordance with the present disclosure. The skilled person having benefit from the present disclosure will appreciate that the method 200 can be carried out by an accordingly configured hardware device, for example a OFDM radar IC comprising a programmable digital signal processor and/or an application specific integrated circuity (ASIC), or the like.

Method 200 comprises receiving 202 a plurality of $N_c \times N_{DS}$ receive samples corresponding to $N_{DS}$ ($1 \leq N_{DS} < N_{sym}$) consecutive OFDM symbols. As has been described before, each OFDM symbol comprises a plurality of $N_c$ subcarriers modulated with a respective modulation symbol. Method 200 further comprises processing 204 each of the $N_c \times N_{DS}$ receive samples by division with its respective modulation symbol (known from the $N_c \times N_{sym}$ matrix $D_{Tx}$ 188) to generate $N_{DS}$ processed or normalized OFDM symbols. Method 200 further comprises decimating 206 the $N_{DS}$ processed OFDM symbols to generate at least one decimated OFDM symbol. The $N_{DS}$ processed OFDM symbols can be decimated in one or two dimensions (the latter if $N_{DS} \geq 2$). Several possible decimation methods can be thought of, such as discarding or averaging certain elements of the processed OFDM symbol vectors, while more advanced decimation methods are possible as well. Method 200 further comprises performing 208 a first type discrete Fourier transform, e.g. an IFFT or FFT, of the at least one decimated OFDM symbol to generate at least one first transformed vector.

Figure 3A:
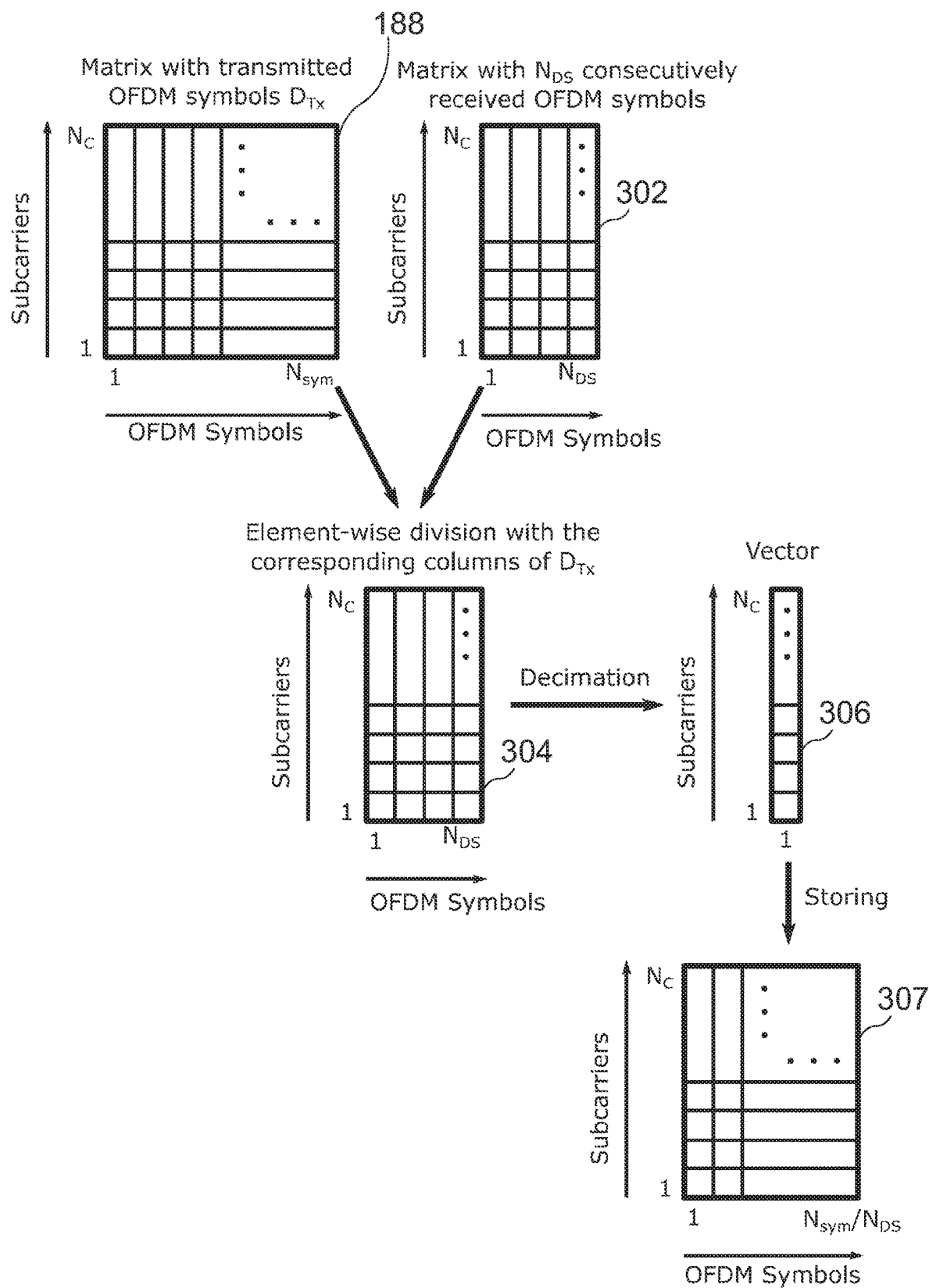
FIG. 3A illustrates a first embodiment of the proposed OFDM signal processing scheme.

FIG. 3A illustrates an example embodiment for reducing vmax.

Like in the conventional case, a frame of $N_c$ analog-to-digital converted receive samples 156 can be transformed via an FFT 154 to recover an OFDM symbol 152-1, . . . , 152-$N_c$. $N_c$ denotes the number of OFDM subcarriers. $N_{DS} < N_{sym}$ consecutively received OFDM symbols of length $N_c$ can be stored in a matrix 302 of size $N_c \times N_{DS}$. Appropriate values for $N_{DS}$ might be 2, 4, 8, . . . . Matrix 302 thus represents only $N_{DS} < N_{sym}$ consecutive OFDM symbols, each OFDM symbol comprising $N_c$ modulated subcarriers. An element-wise division of this matrix 302 with the corresponding entries of matrix $D_{Tx}$ 188 containing the transmitted OFDM symbols leads to a $N_c \times N_{DS}$ matrix 304 corresponding to $N_{DS}$ normalized or processed OFDM symbols. The matrix 304 can then be decimated along the horizontal axis, i.e., the OFDM symbol axis. This can be done via averaging the $N_{DS}$ column vectors corresponding to $N_{DS}$ normalized or processed OFDM symbols to generate a vector 306 of length $N_c$, the vector 306 corresponding to a decimated or averaged OFDM symbol. This procedure can be repeated until all $N_{sym}$ transmitted OFDM symbols are received and processed. The resulting matrix 307 is smaller than the final matrix 190 in FIG. 1B by a factor of $N_{DS}$. Performing FFT and IFFT operations on the rows and columns of this smaller matrix 307 yields an RVM that features a reduced value of $v_{max}$. The final maximum unambiguous relative velocity of an object after this procedure is $\pm v_{max}/N_{DS}$.

Figure 3B:
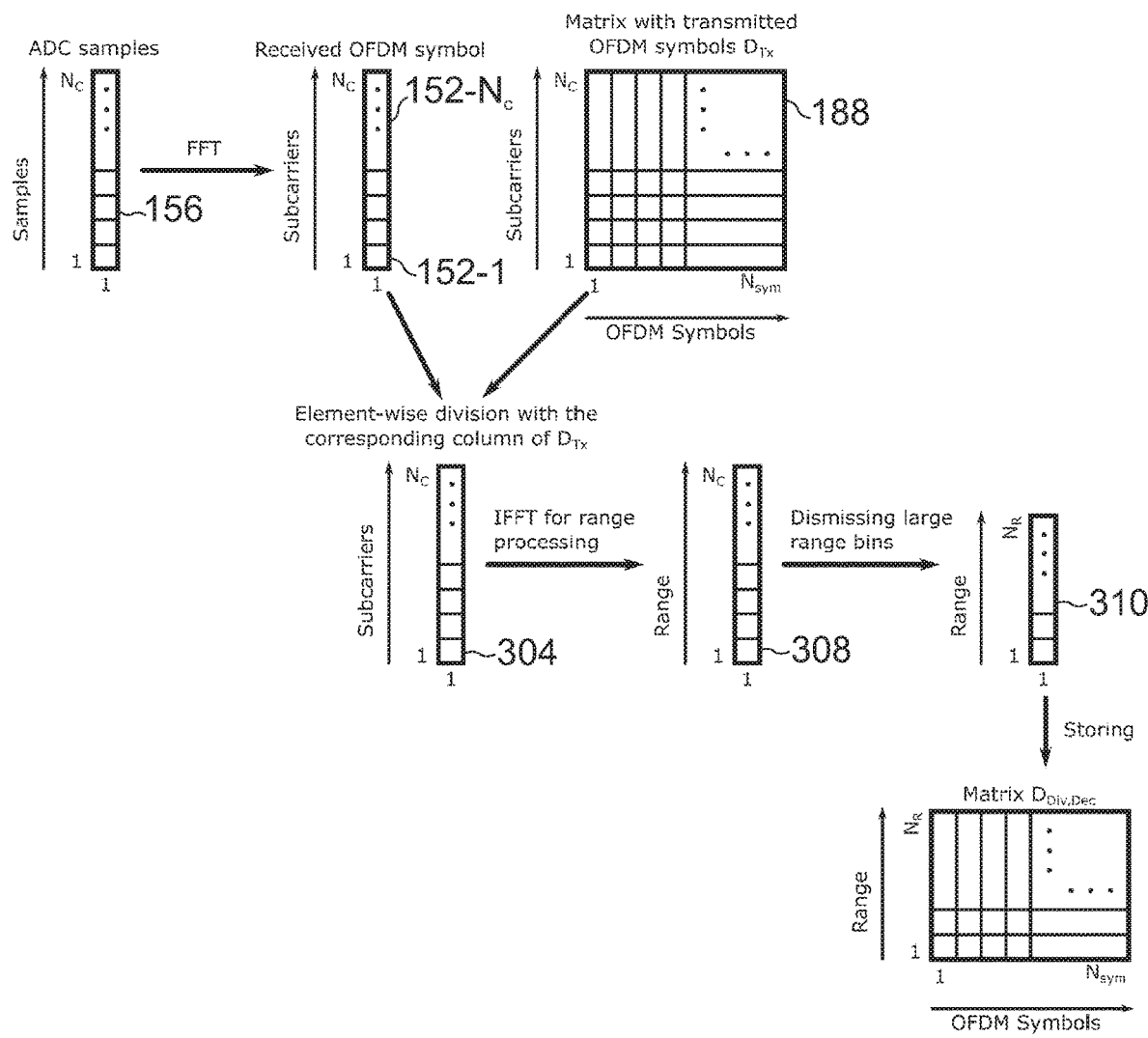
FIG. 3B illustrates a second embodiment of the proposed OFDM signal processing scheme.

FIG. 3B illustrates an embodiment for reducing $R_{max}$.

The ADC samples 156 are transformed via an FFT 154 to obtain the received OFDM symbol 152-1, . . . , 152-$N_c$ of length $N_c$. After element-wise division by the corresponding column of matrix $D_{Tx}$ 188, the resulting normalized OFDM symbol vector 304 of length $N_c$ can be transformed via an IFFT to obtain a range vector 308 comprising range information. The range vector 308 can still contain unnecessary large range bins corresponding to distances which are of no or of less relevance for a particular radar application. Range bins of less relevance can include for example very large distances, e.g. beyond hundred meters for some applications. Thus, the number of $N_c$ elements of the range vector 308 can be reduced from $N_c$ to $N_R < N_c$ to generate a shortened range vector 310 comprising only $N_R$ elements, which are of relevance for the radar application. For example, reducing the number of $N_c$ elements can be done by completely discarding or by combining (e.g. averaging) predetermined elements of the range vector 308, which are of no or less relevance. The shortened range vector 310 can then be stored in a matrix 312. This procedure is repeated until all $N_{sym}$ transmitted OFDM symbols are received and processed. The resulting matrix 312 is smaller than the final matrix 190 in FIG. 1B. Performing FFT operations on the rows of this smaller matrix 312 yields the RVM that features a reduced value of $R_{max}$. The final maximum unambiguous range of an object after this procedure is $\Delta R \cdot N_R$.

Figure 3C:
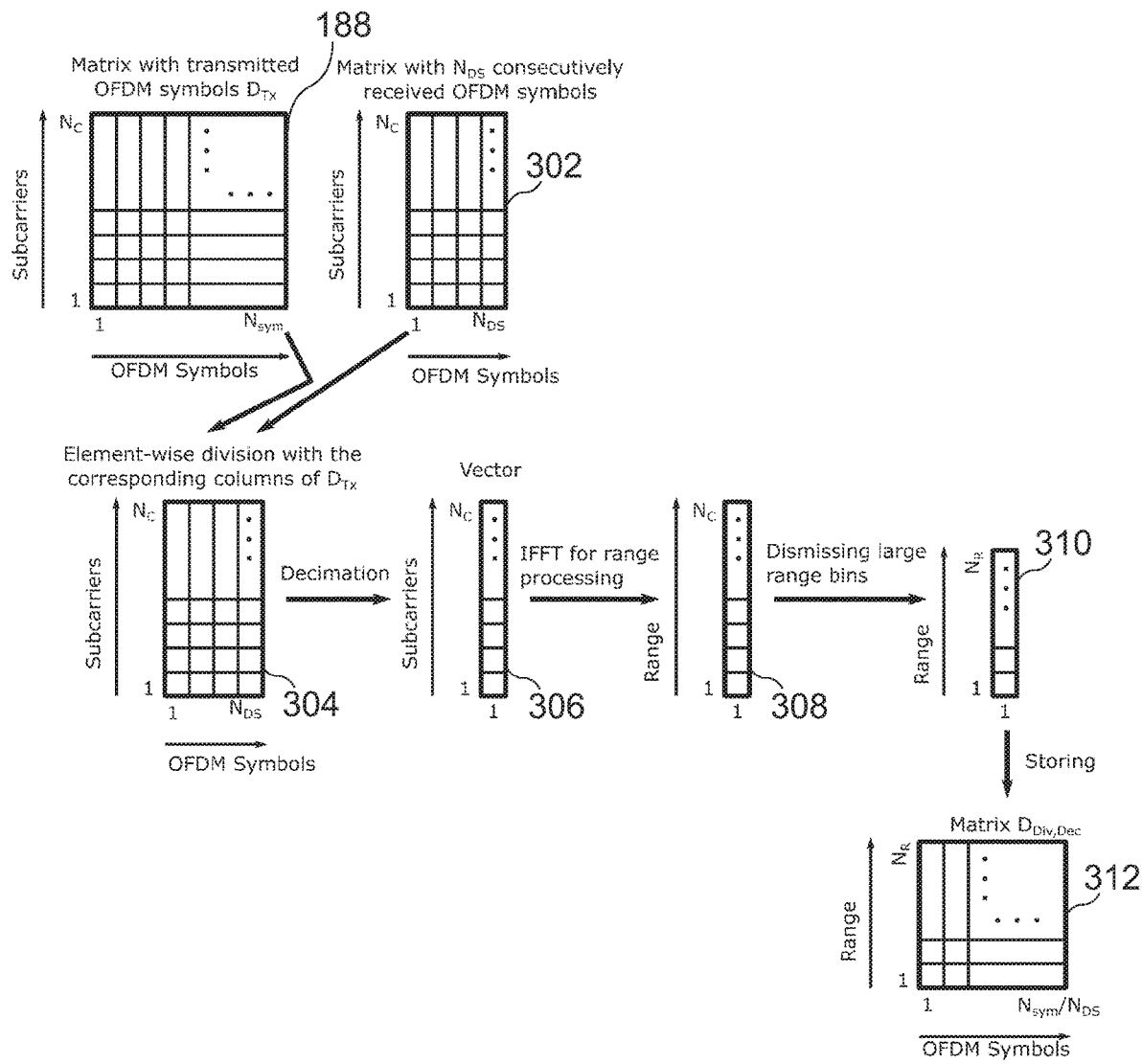
FIG. 3C illustrates a third embodiment of the proposed OFDM signal processing scheme.

FIG. 3C illustrates an embodiment for reducing both $v_{max}$ and $R_{max}$, which is a combination of the embodiments of FIGS. 3A, B.

A plurality of $N_{DS}$ ($1 < N_{DS} < N_{sym}$) consecutively received OFDM symbols are stored in matrix 302 of size $N_c \times N_{DS}$. An element-wise division of this matrix 302 with the corresponding entries of matrix $D_{Tx}$ 188 containing the transmitted OFDM symbols leads to $N_c \times N_{DS}$ matrix 304 corresponding to $N_{DS}$ normalized or processed OFDM symbols. The matrix 304 can then be decimated along the horizontal axis, i.e., the OFDM symbol axis. This can be done via averaging the $N_{DS}$ column vectors corresponding to $N_{DS}$ normalized or processed OFDM symbols to generate a $N_c \times 1$ vector 306 corresponding to a decimated OFDM symbol. An IFFT of the decimated OFDM symbol 306 can be performed to generate a range vector 308 comprising NT, elements or range bins being indicative of a distance of objects from which the OFDM radar signal has been reflected. As mentioned before, the range vector 308 can still contain unnecessary large range bins corresponding to distances which are of no or of less relevance for a particular radar application. Thus, the number of $N_c$, elements of the range vector 308 can be reduced from $N_c$ to $N_R < N_c$ to generate a shortened range vector 310 comprising only $N_R$ elements, which are of relevance for the radar application. For example, reducing the number of $N_c$ elements can be done by completely discarding or by combining (e.g. averaging) predetermined elements of the range vector 308, which are of no or less relevance. The shortened range vector can then be stored in a matrix $D_{Div,Dec}$ 312. The aforementioned acts can be repeated until the whole burst of $N_{sym} = n*N_{DS}$ consecutive OFDM symbols has been received. In this way, the matrix $D_{Div,Dec}$ 312 of size $N_R \times (N_{sym}/N_{DS})$ can be populated with $n = N_{sym}/N_{DS}$ shortened transformed column vectors 310, each of length $N_R$. The size of the matrix $D_{Div,Dec}$ 312 is significantly smaller than the matrix $D_{Div}$ in FIG. 1B.

In order to obtain velocity information, FFTs over the rows of matrix $D_{Div,Dec}$ 312 can be performed to generate a plurality of $N_R$ velocity vectors. Note that the FFT operations for Doppler processing are not shown in FIG. 3. Velocity information can then be extracted from the $N_R$ velocity vectors, the velocity information being indicative of a speed of objects from which the OFDM radar signal has been reflected. Performing FFT operations on the rows of $D_{Div,Dec}$ 312 yields the RVM that features a reduced values of $R_{max}$ and $v_{max}$. The final maximum unambiguous range of an object after this procedure is $\Delta R*N_R$. The maximum unambiguous relative velocity is reduced by a factor of $N_{DS}$.

The resolution of the range and velocity axis ΔR and Δv as well as $T_d$ remain unaltered. Other changes are analyzed in the following.

Computational complexity: The number of IFFT operations required for range processing can be reduced by a factor of $N_{DS}$. The IFFT length $N_c$ can remain unaltered. The number of FFT operations for Doppler processing can be reduced from $N_c$ to $N_R$. Also, the corresponding FFT length can be reduced by a factor of $N_{DS}$.

Memory: The final RVM can feature a size of $N_R \times N_{sym}/N_{DS}$. With a word-length of 16 bit, $2N_R N_{sym} 16/(N_{DS} \cdot 8 \cdot 10^6)$ Mbyte are needed for storing. One could also account for the memory required for storing the $N_{DS}$ consecutively received OFDM symbols. However, since in an actual implementation the size of this memory may depend on the used decimation method, and since $N_{DS}$ might usually not be larger than 10, this memory can be neglected.

Signal-to-Noise Ratio (SNR): The effects on the SNR depends on the utilized decimation method. In the next section, an SNR analysis is presented for the example case when using simple averaging for decimation. This is done for $N_{DS}=2$ and for $N_{DS}=4$.

Reconsider the example discussed above. The performance measures and implementation details of the proposed concept are compared with those of a standard receiver in Table I for $N_R=512$ and for $N_{DS}=4$.

TABLE I

| Parameter | Standard Method | Proposed Method |
| --- | --- | --- |
| $R_{max}$ [m] | 307 | 76.8 |
| ΔR [m] | 0.15 | 0.15 |
| $v_{max}$ [m/s] | ±380 | ±95.2 |
| Δv [m/s] | 0.19 | 0.19 |
| # IFFT ops. for range proc. | 4096 | 1024 |
| IFFT length for range proc. | 2048 | 2048 |
| # FFT ops. for Doppler proc. | 2048 | 512 |
| FFT length for Doppler proc. | 4096 | 1024 |
| Memory for RVM @ 16 bit [Mbyte] | 33.5 | 2.13 |

It is worth noting the significant reduction of the required memory and computational burden. As a further consequence, also the chip size of a corresponding OFDM radar IC and power consumption can be significantly reduced by the proposed method.

The matrix 302 containing $N_{DS}$ consecutively received OFDM symbols is divided element-wise by the corresponding columns of the matrix 188 containing the transmitted OFDM symbols. The resulting matrix 304 of size $N_c \times N_{DS}$ is termed M. Decimating this matrix along the horizontal axis yields a vector of length $N_c$, which is termed $v_{Dec}$. The columns of M contain multiple complex oscillations whose frequencies are proportional to the distances of the objects. The focus now lies on an arbitrary row of M, whose elements are denoted as $m_1, \ldots, m_{N_{DS}}$ $\in \mathbb{C}$. For a single object at $\pm v_{max}$, the phase difference between $m_i$ and $m_{i+1}$ is bounded by $\pm\pi (1 \le i < N_{DS})$. Since the proposed concept can reduce $v_{max}$ by a factor of $N_{DS}$, the phase difference between $m_i$ and $m_{i+1}$ is bounded by $\pm\pi/N_{DS}$ for a single object. Possible values of $m_1, \ldots, m_{N_{DS}}$ are visualized in FIG. 4 for $N_{DS}=2$ and for $N_{DS}=4$.

Figure 4:
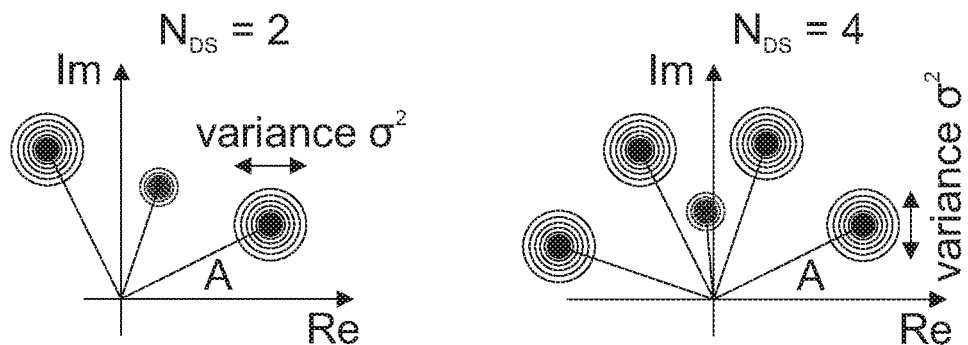
FIG. 4 illustrates exemplary noise-free values of
$$m_1, \ldots, m_{N_{DS}}$$
in Cartesian coordinates, the averaged noise-free value as well as the according noise distribution.

In FIG. 4, A denotes the magnitude of m1 in the noise-free case. For this scenario with a very fast moving object, averaging decreases the signal power from $A^2$ to $\frac{1}{2}A^2$ for the case of $N_{DS}=2$ and to $A^2(1+\sqrt{2})/(2^5/2)$ for the case of $N_{DS}=4$. However, also the noise power by means of the noise variance $\sigma^2$ decreases due to averaging. In fact, the noise variance reduces to $\frac{1}{2}\sigma^2$ for $N_{DS}=2$ and to $\frac{1}{4}\sigma^2$ for $N_{DS}=4$. In total, for the considered case of a single fast moving object, the SNR remains unaltered for $N_{DS}=2$ and one observes a gain in SNR of 2.32 dB for $N_{DS}=4$. Repeating the calculations for an object with zero relative velocity reveals an SNR gain due to averaging of 3.01 dB for $N_{DS}=2$ and of 6.02 dB for $N_{DS}=4$. On the other hand, the proposed OFDM radar signal processing scheme has a decreased FFT length of the Doppler processing block. This decreases the processing gain of the FFT. Since the FFT length is decreased by a factor of $N_{DS}$, the SNR is reduced by 3.01 dB for $N_{DS}=2$ and by 6.02 dB for $N_{DS}=4$. Comparing the gain in SNR due to averaging and the loss in SNR due to a reduced processing gain of the Doppler FFT shows that the SNR remains unaltered for objects with zero relative velocity. For objects with $\pm v_{max}$ relative velocity, one observes a net loss in SNR of 3.01 dB for $N_{DS}=2$ and of 3.7 dB for $N_{DS}=4$. This theoretical SNR analysis was carried out for a single object scenario.

Simulations were carried out for analyzing the SNR behavior of the proposed OFDM receiver signal processing scheme for scenarios with many objects in the field of view. In order to keep the simulation time reasonable, the parameters of the OFDM system were chosen as follows: carrier frequency $f_c=77$ GHz, bandwidth B=500 MHz, number of subcarriers $N_c=512$, number of consecutively transmitted OFDM symbols $N_{sym}=512$, length of the cyclic prefix $T_{cp}=0.51$ μs, transmit power $P_{Tx}=12$ dBm, noise figure NF=5 dB, antenna gains $G_{Tx}=G_{Rx}=4$ dB. With these settings, the performance measures are: $R_{max}=153$ m, ΔR=0.3 m, $v_{max}=\pm635$ m/s, Δv=2.48 m/s. In addition, the maximum range according to the limitations of the cyclic prefix is 76.5 m and the maximum relative velocity for approximately ICI-free operation is 190 m/s.

In the simulations, there is one main object which is used for evaluating the SNR. This main object is located at a distance of 10 m and its relative velocity $v_{rel}$ is varied from $-v_{max}/N_{DS}$ to $v_{max}/N_{DS}$. The radar cross section (RCS) of this main object is 1 m². In addition, there exists 30 other objects in the field of view whose parameters were randomly generated for every simulation run. The ranges were randomly chosen between 2 and 75 m, the relative velocities were randomly chosen between $\pm v_{max}/N_{DS}$, and the RCSs were randomly chosen between 0 and 2 m². The noise floor was evaluated by averaging over the RVM at ranges larger than 80 m. This is why the number of range bins $N_R$ is kept constant at $N_c$. The signal power is approximated by the maximum squared magnitude of the hill corresponding to the main object.

Figure 5:
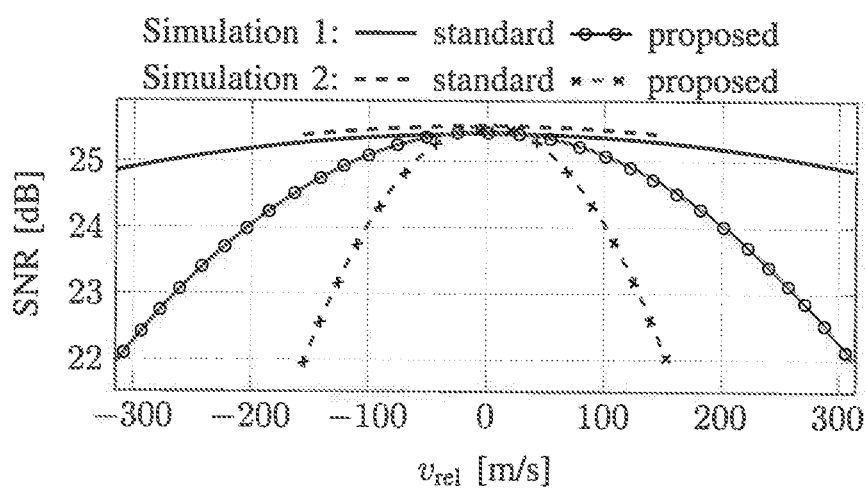
FIG. 5 shows the SNR of the main object in the presence of 30 other objects in the field of view. $N_{DS}=2$ for simulation 1 and $N_{DS}=4$ for simulation 2.

In the first simulation, $N_{DS}=2$ leading to a reduction of the maximum relative velocity from ±635 to ±317.5 m/s. The SNR of the main object for a standard OFDM system and the proposed OFDM receiver signal processing scheme are compared in FIG. 5. One can see that the loss in SNR due to the decimation step is 3 dB for objects with very high relative velocity. For objects with low relative velocity, the loss in SNR is negligible. Hence, the SNR loss derived for a single object approximately remains unaltered in multi-object scenarios. In the second simulation, $N_{DS}$ is increased to 4. The resulting SNR curves are also shown in FIG. 5. Note that the overall SNR values increased compared to the first simulation. The reason for this is that in the first simulation objects exist that are faster than the limit for approximately ICI-free operation, effectively increasing the noise floor. Besides that, the loss in SNR analytically derived in Sec. III for $N_{DS}=4$ also holds in the multi-object case.

More advanced methods for decimation may decrease the loss in SNR. For example, one could separate the RVM into three blocks for large negative, small, and large positive values of the relative velocity. The middle part is calculated as proposed in this work. The first and third blocks are evaluated by de-rotating the vectors in FIG. 4 accordingly before averaging.

The proposed concept can lead to a significant reduction in memory size and computational burden. A significant reduction of the power consumption and chip area of an OFDM radar chip can thereby be achieved. Furthermore, a small fraction of these benefits can be reinvested to increase the SNR at another place of the chip. For example, by increasing the ADC resolution by 1 bit an SNR gain of 6 dB can be achieved. This SNR gain in combination with the SNR loss of the proposed method would result in a net gain in SNR of approximately 3 to 6 dB. For the example discussed above, the maximum loss in SNR of ≈3.7 dB appears for objects at $v_{rel}=\pm 95$ m/s. This value of relative velocity is still quite high even for automotive radar systems. One could minimize the impact of the SNR loss on the system's performance by designing the OFDM radar system such that the loss in SNR is manageable for expected values of the relative velocity. In this particular example, $N_{DS}=2$ can be chosen. Doing so would minimize the loss in SNR for objects with $v_{rel}=\pm 95$ m/s to approximately 0.2 dB only. One drawback would be that the memory required for storing the received OFDM symbols increases from 2.13 to 4.26 Mbyte.

As has been mentioned above, the proposed concept can also be used for MIMO OFDM radar systems. In MIMO radar, several transmit and receive antennas are integrated in a radar sensor, allowing for an estimation of a direction of arrival (DOA) of impinging signals. The number of transmit (Tx) antennas can be denoted as $N_{TX}$ and the number of receive (Rx) antennas can be denoted as $N_{RX}$.

Figure 6:
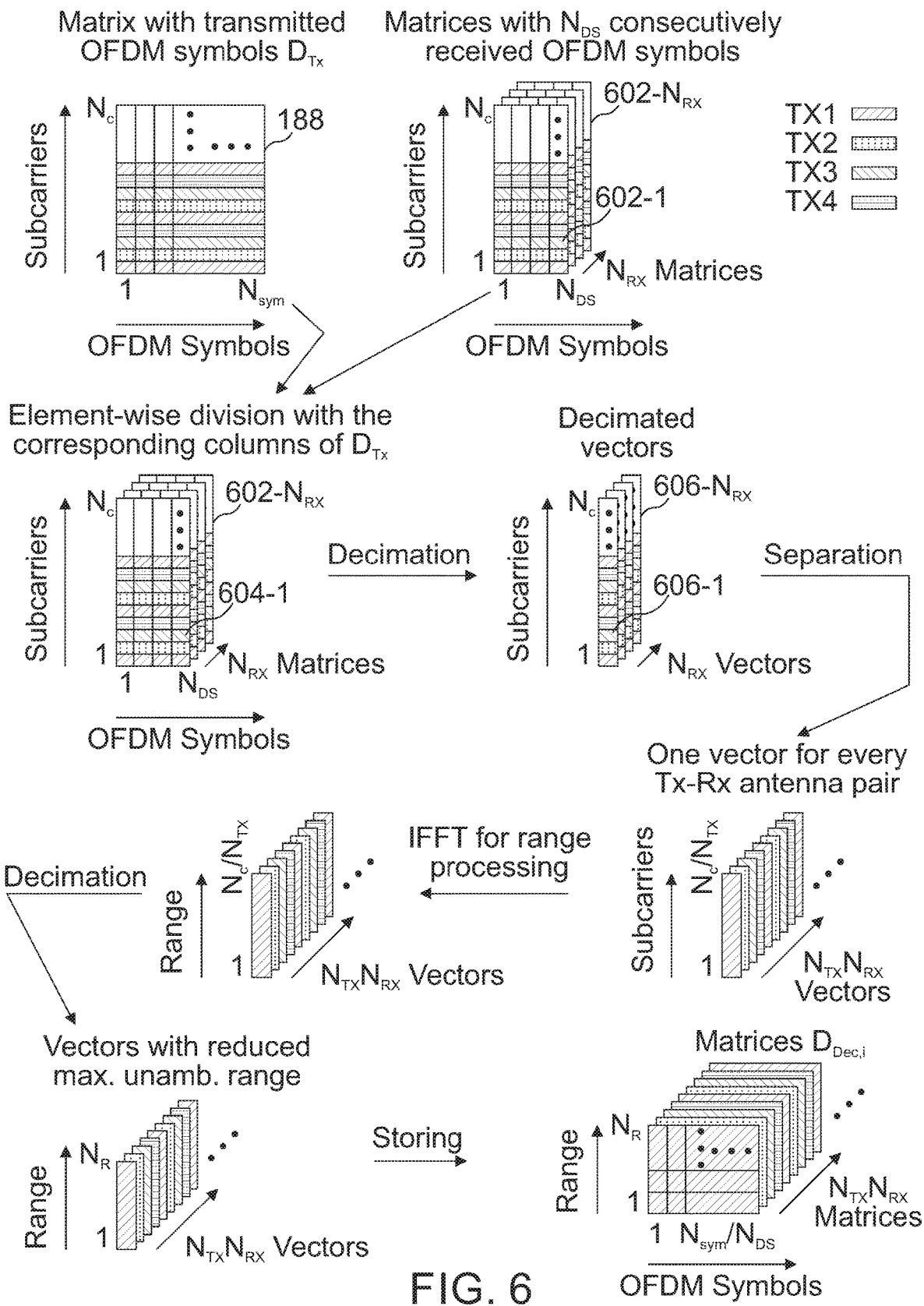
FIG. 6 illustrates an embodiment of the proposed OFDM signal processing scheme for MIMO processing.

For DOA estimation, the Tx signals should be separable at the receivers. This can, for example, be achieved by transmitting orthogonal signals. In OFDM radar, one approach of generating orthogonal signals is to assign each Tx antenna a unique subset of subcarriers. A possible allocation of the subcarriers to the Tx antennas is a uniform allocation, where the first Tx antenna (Tx1) uses subcarriers with the indexes $1+k \cdot N_{TX}$, Tx2 uses the subcarriers with the indexes $2+k \cdot N_{TX}$, and so on (k=0,1,2, . . . ). Such a uniform allocation is indicated in FIG. 6. However, the skilled person having benefit from the present disclosure will appreciate that several variations are possible for the general MIMO concept, for example, a non-uniform allocation of subcarriers.

As shown in FIG. 6, the transmitted OFDM symbols are arranged in one matrix covering all Tx antennas. At the receiver side, $N_{RX}$ data streams of the $N_{RX}$ receive antennas have to be processed. For each data stream, $N_{DS}$ consecutively received OFDM symbols can be stored in a respective matrix 602 of size $N_c \times N_{DS}$. Each one of these matrices 602-1 to 602-$N_{RX}$ can be processed by element-wise division by the corresponding columns of $D_{Tx}$ 188 to obtain normalized matrices 604-1 to 604-$N_{RX}$. Each one of these matrices 604-1 to 604-$N_{RX}$ can be decimated along the horizontal axis, yielding $N_{RX}$ vectors 606-1 to 606-$N_{RX}$ of length $N_c$. Then, these vectors 606-1 to 606-$N_{RX}$ can be separated into $N_{TX} \cdot N_{RX}$ vectors of length $N_c/N_{TX}$, where each one corresponds to a transmission from one of the Tx antennas to one of the Rx antennas. Applying inverse fast Fourier transformations (IFFT) on these vectors can recover the range information. The maximum unambiguous range covered by these vectors might be too large for automotive applications. Hence, these vectors can be decimated to a length $N_R < N_c/N_{TX}$ prior to being stored in $N_{TX} \cdot N_{RX}$ matrices. The final size of these matrices is $N_R \times N_{sym}/N_{DS}$. Applying FFT operations on each row can yield $N_{TX} \cdot N_{RX}$ RVMs of size $N_R \times N_{sym}/N_{DS}$.

Thus, in some embodiments related to MIMO OFDM radar, a first subset of the $N_c$ subcarriers can be associated with a first transmit antenna and a second subset of the $N_c$ subcarriers can be associated with a second transmit antenna. The act 202 of receiving the plurality of $N_c \times N_{DS}$ receive samples can comprise receiving $N_c \times N_{DS}$ samples at each of a plurality of receive antennas. In act 204, the method 200 can comprise generating at least one decimated OFDM symbol for each transmit-receive antenna pair. Act 208 can comprise performing, for each transmit-receive antenna pair, a first type discrete Fourier transform (e.g., IFFT) of the respective decimated OFDM symbol to generate a respective first transformed vector.

Possible variations of the proposed method for reducing memory requirements and computational complexity include:

The decimation along the $N_{DS}$ symbols can be executed after the separation step.

The decimation step for reducing the maximum unambiguous range can be replaced by a filtering and decimation procedure before the IFFT for range processing.

Figure 7:
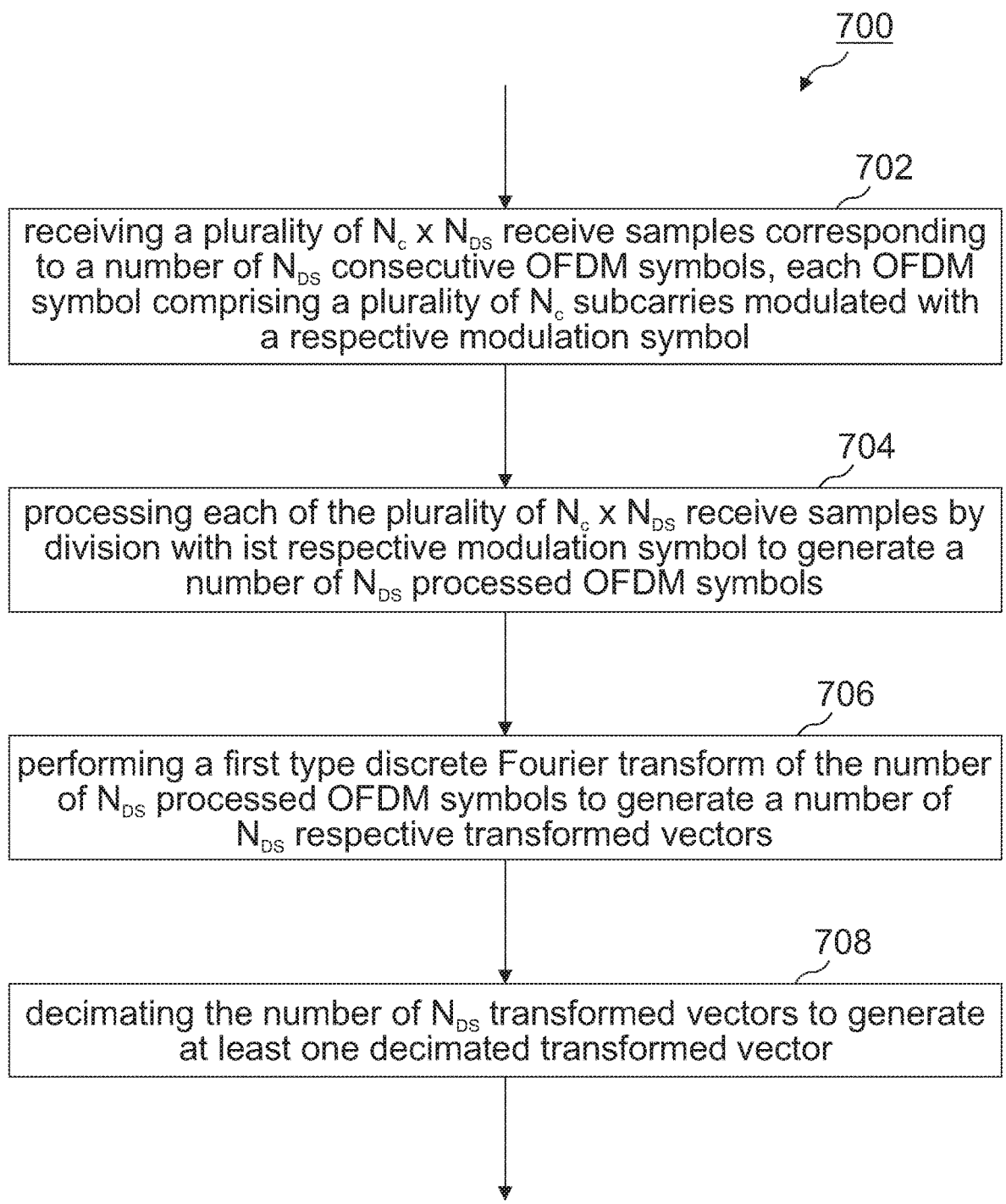
FIG. 7 shows a flowchart of a method for processing an OFDM radar signal according to a further embodiment.
Figure 8:
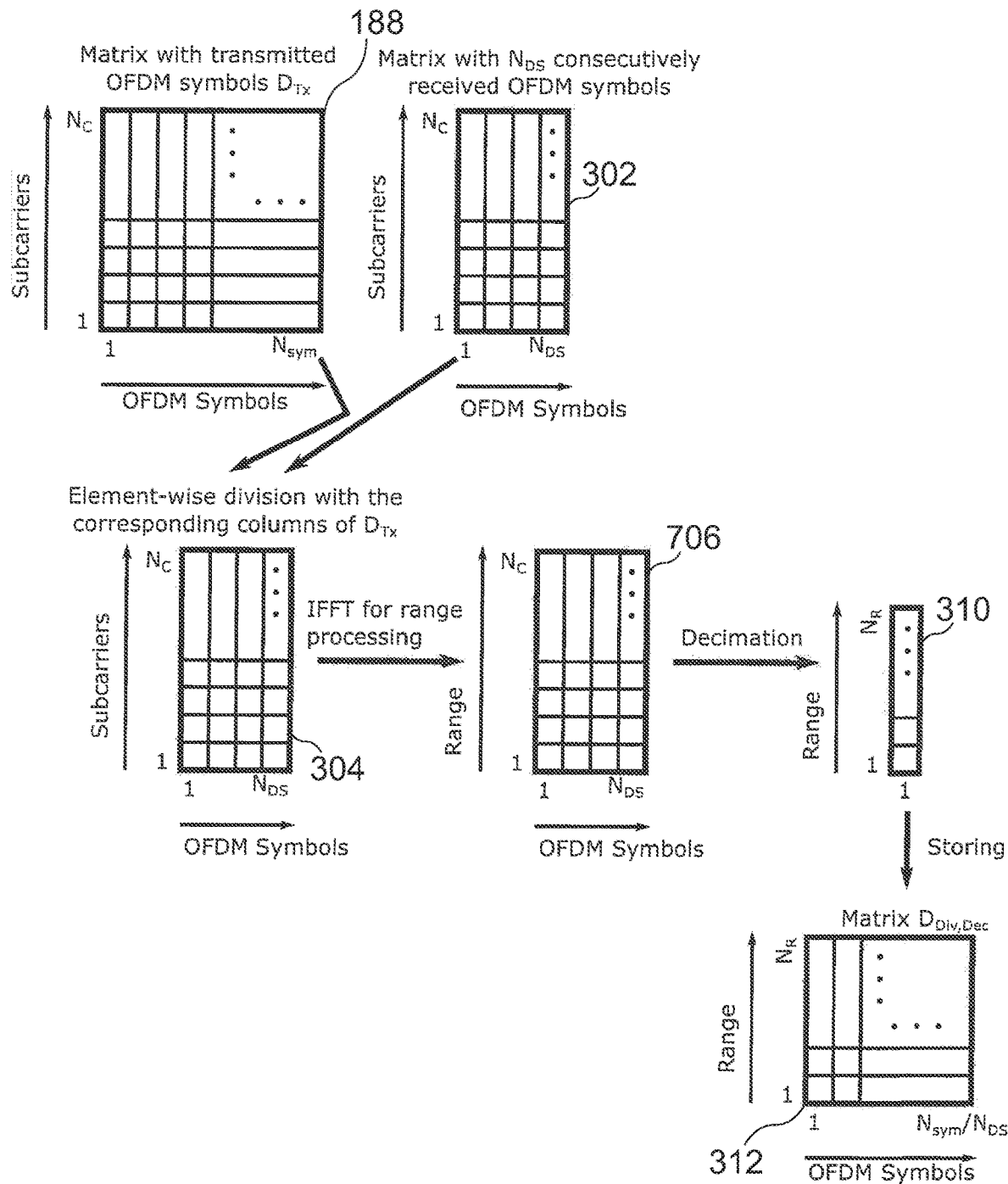
FIG. 8 illustrates a further embodiment of the proposed OFDM signal processing scheme in accordance with the method of FIG. 7.

FIGS. 7 and 8 illustrates a possible variation of the method of FIGS. 2 and 3.

Similar to method 200, the illustrated example method 700 for processing an OFDM radar signal includes receiving 702 a plurality of $N_c \times N_{DS}$ receive samples corresponding to $N_{DS}$ ($1 \le N_{DS} < N_{sym}$) consecutive OFDM symbols, each OFDM symbol comprising a plurality of $N_c$ subcarriers modulated with a respective modulation symbol. In act 704, each of the plurality of $N_c \times N_{DS}$ receive samples is divided by its respective modulation symbol to generate $N_{DS}$ processed OFDM symbols. Different to method 200 of FIG. 2, method 700 then first performs 706 a first type discrete Fourier transform (e.g., IFFT) of the $N_{DS}$ processed OFDM symbols to generate $N_{DS}$ respective transformed vectors. Afterwards, the $N_{DS}$ transformed vectors is decimated to generate at least one decimated transformed vector. The decimation can be done by discarding or combining specific elements of the at least one decimated transformed vector. That is to say, in method 700 the acts of performing the first type discrete Fourier transform and decimation have been reversed with regard to method 200. Again, the skilled person having benefit from the present disclosure will appreciate that method 700 can be carried out by an accordingly configured hardware device, for example a OFDM radar IC comprising a programmable digital signal processor and/or an application specific integrated circuity (ASIC), or the like.

As shown in FIG. 8, a frame of $N_c$ analog-to digital converted receive samples can be transformed via an FFT to recover an OFDM symbol. $N_c$ denotes the number of OFDM subcarriers. However, only $N_{DS} < N_{sym}$ consecutively received OFDM symbols are stored in the matrix 302 of size $N_c \times N_{DS}$. Matrix 302 thus represents only $N_{DS}$ consecutive OFDM symbols, each OFDM symbol comprising $N_c$ modulated subcarriers. An element-wise division of this matrix 302 with the corresponding entries of matrix $D_{Tx}$ 188 containing the transmitted OFDM symbols leads to $N_c \times N_{DS}$ matrix 304 corresponding to $N_{DS}$ normalized or processed OFDM symbols. IFFT operations are applied on the columns of matrix 304 to obtain a matrix 706 containing $N_{DS}$ range vectors, each comprising $N_c$ elements or range bins being indicative of a distance of objects from which the OFDM radar signal has been reflected. The matrix 706 can then be decimated along the horizontal axis, i.e., the OFDM symbol axis. This can be done via averaging the $N_{DS}$ column vectors corresponding to $N_{DS}$ range vectors to generate a $N_c \times 1$ range vector 310 which can be further reduced to length $N_R$ by discarding or combining range bins of no or less interest. The aforementioned acts can be repeated until the whole burst of $N_{sym} = n * N_{DS}$ consecutive OFDM symbols has been received. In this way, a matrix 312 of size $N_R \times (N_{sym}/N_{DS})$ can be populated with $n = N_{sym}/N_{DS}$ range vectors 310, each of length $N_R$. In order to obtain velocity information, FFTs over the rows of matrix 312 can be performed to generate a plurality of $N_R$ velocity vectors. Note that the FFT operations for Doppler processing are not shown in FIG. 8.

Some examples for reducing unnecessary large values of $v_{max}$ and/or $R_{max}$ have been described above. There exist numerous variations of these concepts some of which are listed in the following.

Concept for reducing $v_{max}$:

$N_{DS}$ can theoretically be varied between 1 and $N_{sym}$.

Decimation may also be performed before the element-wise division. This can be done if the decimation is also done for the corresponding transmitted symbols, or if at least $N_{DS}$ equivalent OFDM symbols are transmitted consecutively.

The decimation operation can comprise a summation, weighted summation, averaging, or resample operation.

If more than $N_{DS}$ consecutively received OFDM symbols are stored before or after element-wise division, the output of the decimation step can be a matrix.

Storing the decimated vector can be done after the IFFT operation for range processing.

Concept for reducing $R_{max}$:

$N_R$ can theoretically be varied between 1 and $N_c$.

Dismissing large range bins can be replaced by a decimation or resample operation before the IFFT for range processing. Doing so can have the advantage, that the length of the IFFT can be reduced. Then, this decimation may be performed before the element-wise division. This can be done if the decimation is also done for the corresponding transmitted symbol.

The IFFT operation for range processing and dismissing large range bins can be replaced by a chirp z-transform or by several parallel sliding DFTs.

Concept for reducing $v_{max}$ and $R_{max}$:

Depending on the concrete realization of the decimation operation, the IFFT operation for range processing and the decimation step can be exchanged. Then, the decimation step can be executed after dismissing large range bins.

In this disclosure, a novel OFDM receiver signal processing scheme has been proposed. The concept can offer many beneficial properties such as a reduced memory requirement, a reduction in computational overhead as well as a reduction of unnecessary large values of the maximum unambiguous range and relative velocity. As a further consequence, also the chip size and the power consumption of an OFDM radar chip can be reduced.

The aspects and features mentioned and described together with one or more of the previously detailed examples and figures, may as well be combined with one or more of the other examples in order to replace a like feature of the other example or in order to additionally introduce the feature to the other example.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this is be limited only by the claims and the equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively.

Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for processing an orthogonal frequency-division multiplexing (OFDM) radar signal, the method comprising:
receiving a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol;
processing each of the plurality of $N_c \times N_{DS}$ receive samples by division with its respective modulation symbol to generate a number of $N_{DS}$ processed OFDM symbols;
decimating the number of $N_{DS}$ processed OFDM symbols to generate at least one decimated OFDM symbol; and
performing a first type discrete Fourier transform of the at least one decimated OFDM symbol to generate at least one first transformed vector.

2. The method of claim 1, wherein decimating the number of $N_{DS}$ processed OFDM symbols comprises reducing the number of $N_{DS}$ processed OFDM symbols to a number lower than $N_{DS}$.

3. The method of claim 1, wherein decimating the number of $N_{DS}$ processed OFDM symbols comprises averaging the $N_{DS}$ processed OFDM symbols.

4. The method of claim 1, further comprising:
extracting range information from the at least one first transformed vector, the range information being indicative of a distance of one or more objects from which the OFDM radar signal has been reflected.

5. The method of claim 1, further comprising:
reducing a number of $N_c$ elements of the at least one first transformed vector to a number of $N_R$ elements, where $N_R < N_c$, to generate at least one shortened transformed vector comprising $N_R$ elements.

6. The method of claim 5, wherein reducing the number of $N_c$ elements to the number of $N_R$ elements comprises discarding or combining predetermined elements of the at least one first transformed vector.

7. The method of claim 1, further comprising:
performing at least one further iteration of:
receiving the plurality of $N_c \times N_{DS}$ receive samples,
processing each of the plurality of $N_c \times N_{DS}$ receive samples by division with its respective modulation symbol to generate the number of $N_{DS}$ processed OFDM symbols,
decimating the number of $N_{DS}$ processed OFDM symbols to generate the at least one decimated OFDM symbol, and
performing the first type discrete Fourier transform of the at least one decimated OFDM symbol to generate the at least one first transformed vector,
wherein the at least one further iteration is repeated until a number of $N_{sym} = n \ast N_{DS}$ consecutive OFDM symbols has been received, wherein n is an integer.

8. The method of claim 7, further comprising
performing a second type discrete Fourier transform over rows of a matrix, $D_{Div,Dec}$, the matrix $D_{Div,Dec}$ containing n columns of n consecutive first transformed vectors, to generate a number of second transformed vectors.

9. The method of claim 8, wherein the matrix $D_{Div,Dec}$ contains $N_R < N_c$ rows and $n = N_{sym}/N_{DS}$ columns, wherein $N_R$ corresponds to a reduced number of elements of each of the n consecutive first transformed vectors.

10. The method of claim 8, further comprising:
extracting speed information from the second transformed vectors, the speed information being indicative of a speed of one or more objects from which the OFDM radar signal has been reflected.

11. The method of claim 1, wherein a first subset of the $N_c$ subcarriers is associated with a first transmit antenna and a second subset of the $N_c$ subcarriers is associated with a second transmit antenna, and wherein receiving the number of $N_c \times N_{DS}$ receive samples comprises receiving $N_c \times N_{DS}$ samples at each of a plurality of receive antennas,
where the method further comprises:
generating at least one decimated OFDM symbol for each transmit-receive antenna pair; and
performing, for each transmit-receive antenna pair, the first type discrete Fourier transform of a respective decimated OFDM symbol to generate a respective first transformed vector.

12. A non-transitory computer-readable medium comprising a computer program having a program code for causing a programmable hardware device to execute a method for processing an orthogonal frequency-division multiplexing (OFDM) radar signal, the computer program comprising the steps of claim 1.

13. A method for processing an orthogonal frequency-division multiplexing (OFDM) radar signal, the method comprising:
receiving a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol;
processing each of the plurality of $N_c \times N_{DS}$ receive samples by division with its respective modulation symbol to generate a number of $N_{DS}$ processed OFDM symbols;
performing a first type discrete Fourier transform of the number of $N_{DS}$ processed OFDM symbols to generate a number of $N_{DS}$ respective transformed vectors; and
decimating the number of $N_{DS}$ transformed vectors to generate at least one decimated transformed vector.

14. The method of claim 13, wherein decimating the number of $N_{DS}$ transformed vectors comprises averaging the $N_{DS}$ transformed vectors.

15. The method of claim 13, further comprising:
reducing a number of $N_c$ elements of the at least one first transformed vector to a number of $N_R$ elements, where $N_R < N_C$, to generate at least one shortened transformed vector comprising $N_R$ elements.

16. The method of claim 15, further comprising:
performing a second type discrete Fourier transform of the at least one shortened transformed vector.

17. An apparatus for processing an orthogonal frequency-division multiplexing (OFDM) radar signal, the apparatus comprising:
a receiver configured to receive a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol; and
a processor configured to:
process each of the plurality of $N_c \times N_{DS}$ receive samples by division with its respective modulation symbol to generate a number of $N_{DS}$ processed OFDM symbols;
decimate the number of $N_{DS}$ processed OFDM symbols to generate at least one decimated OFDM symbol; and
perform a first type discrete Fourier transform of the at least one decimated OFDM symbol to generate at least one first transformed vector.

18. The apparatus of claim 17, wherein the processor is further configured to
reduce a number of $N_c$ elements of the at least one first transformed vector to a number of $N_R$ elements, where $N_R < N_c$, to generate at least one shortened transformed vector comprising $N_R$ elements; and
perform a second type discrete Fourier transform of the at least one shortened transformed vector to generate at least one second transformed vector.

19. An apparatus for processing an orthogonal frequency-division multiplexing (OFDM) radar signal, the apparatus comprising:
a receiver configured to receive a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol; and
a processor configured to:
process each of the plurality of $N_c \times N_{DS}$ receive samples by division with its respective modulation symbol to generate a number of $N_{DS}$ processed OFDM symbols;
perform a first type discrete Fourier transform of the number of $N_{DS}$ processed OFDM symbols to generate a number of $N_{DS}$ respective transformed vectors;
decimate the number of $N_{DS}$ transformed vectors to generate at least one decimated transformed vector.

20. An orthogonal frequency-division multiplexing (OFDM) radar transceiver, comprising:
a receiver configured to receive a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol; and
a processor configured to:
process each of the plurality of $N_c \times N_{DS}$ receive samples by division with its respective modulation symbol to generate a number of $N_{DS}$ processed OFDM symbols;
decimate the number of $N_{DS}$ processed OFDM symbols to generate at least one decimated OFDM symbol; and
perform a first type discrete Fourier transform of the at least one decimated OFDM symbol to generate at least one first transformed vector.

21. An orthogonal frequency-division multiplexing (OFDM) radar transceiver, comprising:
a receiver configured to receive a plurality of $N_c \times N_{DS}$ receive samples corresponding to a number of $N_{DS}$ consecutive OFDM symbols, each OFDM symbol comprising a plurality of $N_c$ subcarriers modulated with a respective modulation symbol; and
a processor configured to:
process each of the plurality of $N_c \times N_{DS}$ receive samples by division with its respective modulation symbol to generate a number of $N_{DS}$ processed OFDM symbols;
perform a first type discrete Fourier transform of the number of $N_{DS}$ processed OFDM symbols to generate a number of $N_{DS}$ respective transformed vectors;
decimate the number of $N_{DS}$ transformed vectors to generate at least one decimated transformed vector.

* * * * *